Figure 1:
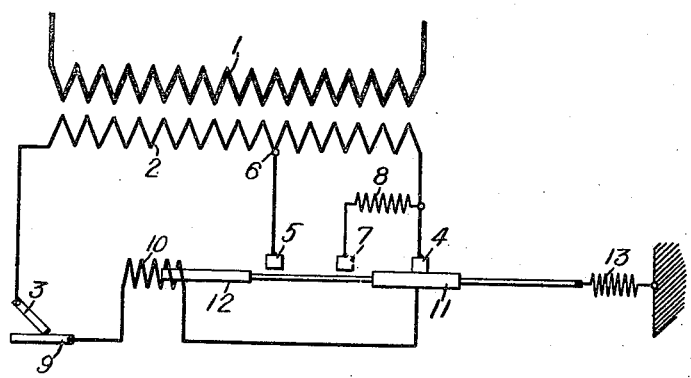

O. H. ESCHHOLZ.
ARC WELDING SYSTEM.
APPLICATION FILED SEPT. 8, 1919.

1,343,200.

Patented June 15, 1920.

WITNESSES:
J. A. Helsel
O. E. Bee.

INVENTOR
Otto H. Eschholz
BY
Wesley G. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ARC-WELDING SYSTEM.

1,343,200.  Specification of Letters Patent.  Patented June 15, 1920.

Application filed September 8, 1919. Serial No. 322,282.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Arc-Welding Systems, of which the following is a specification.

My invention relates to arc welding systems and particularly to welding systems employing alternating current. The primary object of my invention is to so improve the starting characteristics of an alternating-current welding system that moderately skilled operators may obtain strong and homogeneous welds by means of the alternating current arc.

It has been found, however, that, while alternating current possesses many desirable features, when employed in a welding system, it also possesses some disadvantages which materially restrict its field of application. For example, it has been very difficult for any but highly skilled operators to weld by means of alternating current on account of the fact that it has been difficult to start an arc when utilizing bare electrodes. This difficulty is believed to be occasioned by the reversals of current which create unstable conditions.

One object of my invention, therefore, is to so improve the starting characteristics of an alternating-current welding system that less highly skilled operators may readily draw an arc, after which it may be maintained by exercising a degree of skill of which an ordinary welder is capable.

Another disadvantage which has been found in alternating-current welding systems is the fact that, in order to obtain good starting characteristics, a voltage must be employed which constitutes a definite shock hazard. I have found that, a relatively high starting voltage may be employed to improve the starting characteristics of an alternating-current welding system, and that the hazard introduced by such high starting voltage may be obviated. Another object of my invention resides in the provision of means for utilizing a relatively high starting voltage in an alternating-current welding system and means for automatically reducing the initial starting voltage to a desirable operating and open-circuit value.

A still further object of my invention is to provide means for automatically reducing a relatively high starting voltage to a safe open-circuit voltage which operates without any attention from the operator, thereby providing a positive protection at all times.

With these and other objects in view, my invention will be more fully described, illustrated in the drawings, in the several views of which corresponding numerals indicate like parts, and then particularly pointed out in the claims.

Figure 2:
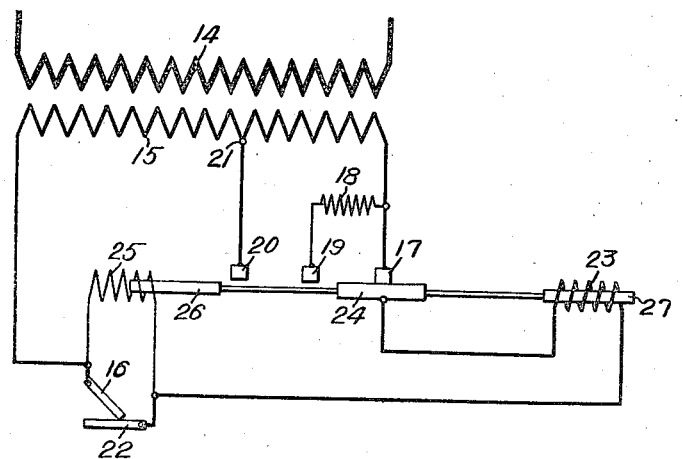

In the drawings, Figure 1 is a diagrammatic view of a welding circuit constructed in accordance with my invention, and Fig. 2 is a similar view illustrating a modification of my invention.

In practising my invention, I provide means for improving the starting characteristics of an alternating-current welding system to coöperate with an ordinary or special design of transformer suitable for welding. Since most alternating-current welding systems employ transformers, either of special or of ordinary design, the improvements I have incorporated do not materially add to the expense of a complete system, nor do they complicate the system to any material extent.

I may provide a high starting voltage for an alternating-current system by employing a transformer having primary and secondary windings, by connecting the secondary winding at one side to an electrode and by providing a plurality of stationary contact-members connected to different turns in the secondary winding to provide different values of electromotive force between the electrode and the contact-members. I may connect another electrode, or piece of work, to a movable contact-member, which is adapted to engage the stationary contact-members and may be moved into engagement with the various members by automatic means which will hereinafter be more fully described.

In the drawings, Fig. 1 is a welding system comprising a primary winding 1 inductively related to a secondary winding 2 which may be connected, at one side, to an electrode 3. The other side of the winding 2 may be connected to a stationary contact-member 4 and another stationary contact-member 5 may be connected to one of the turns of the secondary winding, as indicated at 6. Another stationary contact-member 7 may be connected to a resistor 8 and to the member 4. I may connect another electrode or a piece of work 9, through a coil 10, to a movable contact member 11. The movable contact-member 11 may be secured to a plunger or core member 12 which is actuated by the coil 10, and the member 11 may also be connected to a spring 13, fastened to any suitable support.

It will be apparent that the spring 13, which is connected to the movable contact-member 11, tends to maintain it always in engagement with the stationary contact member 4. On open circuit, therefore, the full voltage is applied across the electrodes 3 and 9. When the electrodes 3 and 9 are short-circuited, in the usual manner, the coil 10 is energized by the current flowing through the circuit thus established and tends to actuate the core member 12 and to move the member 11, first into engagement with the stationary member 7 and then into engagement with the stationary member 5. The stationary member 7 is provided to prevent breaking the circuit after the electrodes have been short-circuited and the movable contact-member drawn toward the stationary member 5. The resistor 8 may be replaced with an inductance or a partial inductance and partial resistance to reduce the sparking between the contact-members and to prevent short-circuit of that part of the secondary winding included between the stationary contact-members 4 and 5. The electrodes 3 and 9 are, of course, slowly separated to draw an arc, and the movable contact-member 11 remains in engagement with the stationary contact-member 4 for a sufficient length of time to facilitate drawing of the arc by providing the full voltage of the system across the electrodes. Immediately after the arc has been established, the contact-member 11 is moved into engagement with the contact-member 5, and the operating voltage is thereby reduced from the high initial value to a desirable operating value.

It will be apparent from the foregoing description that the spring 13 tends to maintain the movable member 11 always in engagement with the member 4, and, therefore, to provide an open-circuit voltage equal to the starting voltage. Although this is a distinct advantage, in facilitating the drawing of the arc, it does not, however, remove the hazard connected with the employment of a high starting voltage and a high open-circuit voltage.

In order to enjoy both the advantage of a high starting voltage and a low open-circuit voltage, I provide a modified form of welding system, such as is shown in Fig. 2. As here shown, I employ a primary winding 14 inductively related to a secondary winding 15 which is connected, at one side, to an electrode 16. The other side of the secondary winding 15 may be connected to a stationary contact-member 17 which is connected, through a resistor 18, to another stationary contact-member 19. Another stationary contact-member 20 is connected to a turn between the ends of the secondary winding 15, as indicated at 21. The foregoing part of the system is like the corresponding portion of the system shown in Fig. 1. I may connect the electrode or piece of work 22, through a coil 23, to a movable contact-member 24. Another coil 25 may be connected in parallel relation to the electrodes 16 and 22. The coils 23 and 25 may both be provided with core members 26 and 27, which may be mechanically secured to the movable member 24, thereby providing means for actuating the movable member 24.

In operating the welding system shown in Fig. 2, the primary winding 14 may be connected to a suitable source of alternating current. The initial position of the movable contact-member 24 is such that it engages the stationary contact-member 20, but, when the electrodes 16 and 22 are short-circuited, the coil 23 is thereby energized by the current flowing in the circuit and so actuates the core member 27 as to cause the movable member 24 to consecutively engage the contact-member 19 and, lastly, the member 17. Upon separating the electrodes to establish an arc therebetween, the coil 25 is energized and overcomes the action of the series-connected coil 23 and causes the movable electrode 24 to move into engagement with the stationary member 20.

It will be appreciated, from the foregoing description, that, upon short-circuiting the electrodes, the full voltage of the secondary winding 15 is immediately available across the electrodes, and, when the electrodes are separated to establish an arc, the relatively high starting voltage is immediately, or shortly thereafter, reduced to a desirable operating value. Furthermore, if, for any reason, the arc is blown out and open-circuit conditions are thus established, the low operating voltage of the system still obtains, thereby protecting the operator from hazardous high-voltage conditions.

It will be obvious that, if it is found desirable, a time element may be introduced into the welding systems above described by so providing suitable retarding devices that the movement of the movable contact-member may be regulated, as desired. This may prove an advantage if it be found that the initial starting voltage is too quickly reduced to insure sufficient time for an operator to establish a stable arc. I believe that the above described welding systems will remove many of the objections heretofore advanced against alternating-current welding systems.

It has been found that a high starting current may produce, to a certain extent, satisfactory starting characteristics in an alternating-current welding system, but some objection has been found to employing a high starting current on account of the tendency of the electrodes to fuse or "freeze" to the work. I have found that the employment of a relatively high starting voltage makes possible the utilization of bare electrodes which have been exceedingly difficult to employ heretofore. I am fully aware of various systems which provide means for limiting the arc voltage to a certain predetermined value, but these systems do not disclose the value of a high initial starting voltage which may be subsequently reduced to a safe open-circuit or low operating voltage. My present invention does not contemplate the mere limiting of the arc length by governing the voltage across the arc but covers the more advantageous feature of distinctively improving the starting characteristics of the welding system without subjecting the operator to hazardous conditions.

Although I have shown and specifically described a plurality of welding systems which may be provided by my invention, it is obvious that minor changes may be made in the connections thereof, and in the arrangement of the parts of the system without departing from the spirit and scope of my invention, and I desire, therefore, that no limitations shall be imposed except such as are indicated in the appended claims.

I claim as my invention:

1. An alternating-current arc welding system comprising means for connecting the electrodes to a source of relatively high voltage and means for automatically reducing the voltage to a desirable operating value.

2. An alternating-current arc welding system comprising means for connecting the electrodes to a source of relatively high voltage and means for automatically reducing the voltage to a desirable operating value, the latter means including a movable contact member and a coil connected in series with the electrodes to operate the contact-member when an arc is established between the electrodes.

3. An arc welding system comprising a plurality of inductively related windings, an electrode connected to one side of one of the windings, a plurality of stationary contact members connected to the winding at spaced intervals, a movable contact-member which is adapted to engage the stationary contact-members connected to another electrode and means for moving the latter contact member to connect the latter electrode to various parts of the winding by engagement with the various stationary contact-members.

4. An arc welding system comprising a transformer having a primary and a secondary winding, an electrode connected to one side of the secondary winding, a plurality of stationary contact-members connected to various turns of the secondary winding, a movable contact-member connected to another electrode and adapted to engage the stationary contact-members and means tending to always maintain the movable contact-member in engagement with one of the stationary contact-members.

5. An arc welding system comprising a transformer having a primary and a secondary winding, an electrode connected to one side of the secondary winding, a plurality of stationary contact-members connected to various turns of the secondary winding, a movable contact-member connected to another electrode and adapted to engage the stationary contact-members, means tending to always maintain the movable contact-member in engagement with one of the stationary members and arc-current-controlled means for moving the contact-member to engage another stationary member.

6. An arc welding system comprising a transformer having primary and secondary windings, an electrode connected to one side of the secondary winding, a plurality of stationary contact-members connected to various turns of the secondary winding, a movable contact-member connected to another electrode and adapted to engage the stationary contact-members, a spring connected to the movable contact-member which tends to maintain it in engagement with one of the stationary members, an arc-current-controlled means for moving the contact-member to engage another stationary contact-member.

7. An arc welding system comprising a transformer having primary and secondary windings, an electrode connected to one side of the secondary winding, a plurality of stationary contact-members connected to various turns of the secondary winding, a movable contact-member connected to another electrode and adapted to engage the stationary contact-members and a coil connected in series with the movable contact-member and having a core member secured to the member whereby the movable contact-member is moved to engage another stationary contact-member when the coil is energized by a welding current.

8. An arc welding system comprising a transformer having primary and secondary windings, an electrode connected to one side of the secondary winding, a plurality of stationary contact-members connected to include a different number of turns of the secondary winding between the electrode and the members, a movable contact-member adapted to engage the stationary members connected to another electrode, arc-current-controlled means for moving the movable contact-member to engage one of the stationary contact-members and arc-voltage-controlled means for moving the movable contact-member to engage another stationary contact-member.

In testimony whereof, I have hereunto subscribed my name this 2nd day of Sept. 1919.

OTTO H. ESCHHOLZ.